United States Patent
Yang

(10) Patent No.: US 8,649,578 B2
(45) Date of Patent: Feb. 11, 2014

(54) METHOD AND SYSTEM FOR DEFINING A BREAST WINDOW

(75) Inventor: Yi Yang, Waterloo (CA)

(73) Assignee: AGFA Healthcare Inc., Toronto (CA)

( * ) Notice: Subject to any disclaimer, the term of this patent is extended or adjusted under 35 U.S.C. 154(b) by 548 days.

(21) Appl. No.: 12/719,373

(22) Filed: Mar. 8, 2010

(65) Prior Publication Data
US 2011/0216949 A1    Sep. 8, 2011

(51) Int. Cl.
*G06K 9/00* (2006.01)

(52) U.S. Cl.
USPC .......................................................... 382/128

(58) Field of Classification Search
None
See application file for complete search history.

(56) References Cited

U.S. PATENT DOCUMENTS

| | | | | |
|---|---|---|---|---|
| 6,990,239 | B1 * | 1/2006 | Nelson | 382/224 |
| 7,764,820 | B2 * | 7/2010 | Wu et al. | 382/132 |
| 7,865,002 | B2 * | 1/2011 | Basilico et al. | 382/128 |
| 2006/0147101 | A1 | 7/2006 | Zhang et al. | |
| 2006/0171573 | A1 * | 8/2006 | Rogers | 382/128 |

OTHER PUBLICATIONS

European Search Report/Written Opinion, completion of search dated Jun. 16, 2011 for European Patent No. 2,372,649.

"Segmentation of Regions of Interest in Mammograms in a Topographic Approach", IEEE Transactions on information technology in biomedicine, IEEE Service Center, Los Alamitos, CA, US, vol. 13, No. 1, Jan. 1, 2010, pp. 129-139, XP011296552, ISSN: 1089-7771, Abstract—pp. 132, right-hand column, lines 18-20 and pp. 135, left-hand column, lines 52-55, Byung-Woo Hong et al.

* cited by examiner

*Primary Examiner* — Luke Gilligan
*Assistant Examiner* — Kristine Rapillo
(74) *Attorney, Agent, or Firm* — Bereskin & Parr LLP; Isis Caulder

(57) ABSTRACT

A computer implemented method for defining a breast window within an image for a breast, said image containing a breast image having a breast boundary, the method comprising: identifying a center region of the breast image, where the center region is coincident with an edge of the image; defining the edge of the image as the first border of the breast window; searching from the center region along the edge of the image for the breast boundary, the breast boundary informing a second border of the breast window; searching from the center region along the edge of the image in an opposite direction for the breast boundary, the breast boundary informing a third border of the breast window; and repeatedly searching from the center region in a direction orthogonal to the edge of the image for a point on the breast boundary most distant from the edge of the image, the point on the breast boundary informing a fourth border of the breast window. In some embodiments, the image may be rotated/flipped and/or subsampled and/or thresholded to form a binary image before a breast window is searched. A method of thresholding the image is also disclosed.

21 Claims, 9 Drawing Sheets

METHOD AND SYSTEM FOR DEFINING A BREAST WINDOW

FIELD

The embodiments described herein relate to a system and method for image analysis and more particularly a system and method for defining a breast window within an image containing a breast.

BACKGROUND

Radiologists examine mammography images to diagnose various abnormalities in a breast. When examining these images on a mammography computer system, physicians typically only desire to look at the breast image and not any of the background. Currently, physicians must manually adjust the zoom factor when viewing a mammography image so as to fill the viewing area with the breast image. This process of manual adjustment is inconvenient and time-consuming for radiologists. Thus, it is desirable to provide a method of defining a breast window on an image containing a breast, such that the breast window can fill the entirety of the viewing area.

One attempt at defining a breast window may involve employing traditional edge detection techniques on mammography images to identify the breast boundary, and forming a breast window around the identified breast boundary. Such attempt, however, requires the use of edge detection techniques that are mathematically and computationally intensive, thereby reducing the performance and responsiveness of breast window definition. The resultant delay in adjusting the viewing area to that of a breast window negatively impacts the examining physician's experience, and may cause inconvenience and frustration for the radiologist. The breast window definition is thus desired to be both accurate and efficient.

SUMMARY OF THE INVENTION

The embodiments described herein provide in one aspect, a computer implemented method for defining a breast window within an image for a breast, said image containing a breast image having a breast boundary, the method comprising:

(a) identifying a center region of the breast image, where the center region is coincident with an edge of the image;
(b) defining the edge of the image as the first border of the breast window;
(c) searching from the center region along the edge of the image for the breast boundary, the breast boundary informing a second border of the breast window;
(d) searching from the center region along the edge of the image in a direction opposite from (c) for the breast boundary, the breast boundary informing a third border of the breast window; and
(e) repeatedly searching from the center region in a direction orthogonal to the edge of the image for a point on the breast boundary most distant from the edge of the image, the point on the breast boundary informing a fourth border of the breast window.

The embodiments described herein provide in another aspect, a system for defining a breast window within an image for a breast, said image containing a breast image having a breast boundary, the system comprising:

(a) a memory for storing the image;
(b) a processor coupled to the memory for:
   (i) identifying a center region of the breast image, where the center region is coincident with an edge of the image;
   (ii) defining the edge of the image as the first border of the breast window;
   (iii) searching from the center region along the edge of the image for a breast boundary, the breast boundary informing a second border of the breast window;
   (iv) searching from the center region along the edge of the image in a direction opposite from (iii) for the breast boundary, the breast boundary informing a third border of the breast window; and
   (v) repeatedly searching from the center region in a direction orthogonal to the edge of the image for a point on the breast boundary most distant from the edge of the image, the point on the breast boundary informing a fourth border of the breast window.

Further aspects and advantages of the embodiments described herein will appear from the following description taken together with the accompanying drawings.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

Figure 1:
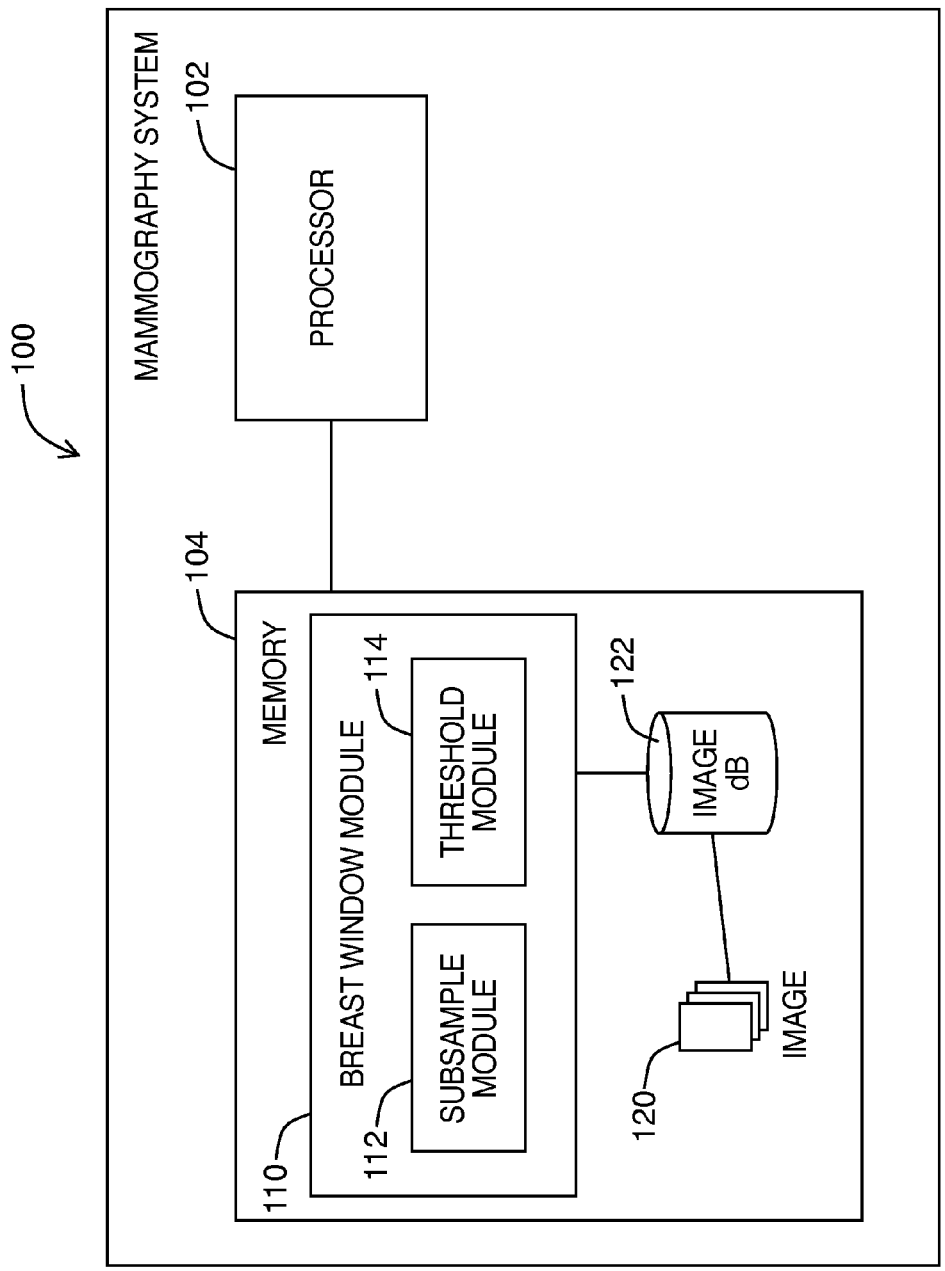
FIG. 1 is a block diagram of a mammography system.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The embodiments of the systems and methods described herein may be implemented in hardware or software, or a combination of both. However, preferably, these embodiments are implemented in computer programs executing on programmable computers each comprising at least one processor, a data storage system (including volatile and non-volatile memory and/or storage elements), at least one input device, and at least one output device. For example and without limitation, the programmable computers may be a personal computer, laptop, personal data assistant, and cellular telephone. Program code is applied to input data to perform the functions described herein and generate output information. The output information is applied to one or more output devices, in known fashion.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer, for configuring and operating the computer when the storage media or device is read by the computer to perform the procedures described herein. The subject system may also be considered to be implemented as a computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Referring to FIG. 1, therein illustrated is an example embodiment of a mammography system 100. A mammography system 100 may contain a processor 102, operatively coupled to memory 104. Memory 104 stores a breast window module 110 for defining breast windows on images 120 stored on image database 122. In operation, breast window module 110 may use subsample module 112 and threshold module 114 to define a breast window.

Figure 2A:
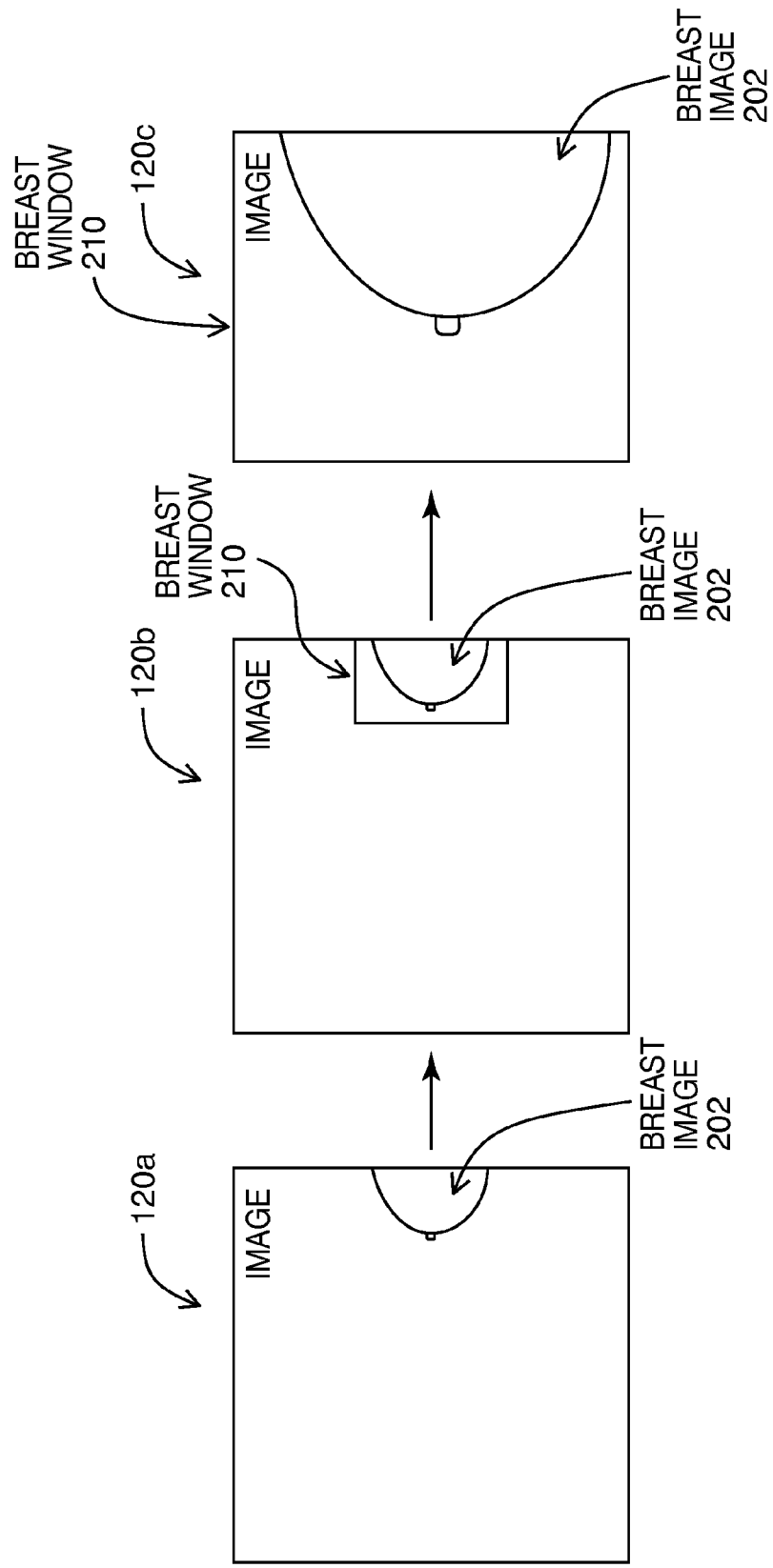
FIG. 2A is a schematic diagram illustrating the definition of a breast window within an image and the application of the breast window to a breast image for close examination.

Images 120 stored on image database 122 may be images containing a breast image. In one embodiment, images 120 may be mammography images. Those skilled in the art will appreciate that there may be two types of mammography images: craniocaudal (CC), containing a view of a breast as taken through the top of the breast; and mediolateral oblique (MLO), containing a view of a breast as taken from the center of the chest to the lateral of the breast. Referring briefly to FIGS. 2A/2B and 4, therein illustrated are examples of CC and MLO images respectively. For these images, the center region of the breast is typically coincident with an edge of the image.

Breast window module 110 is configured to define a breast window around a breast image on image 120. As is described in greater detail below, the steps of this process involves identifying a center region of the breast image and searching from the center region outwards for the breast boundary such that points on the breast boundary inform the borders of the breast window. In the exemplary embodiment, an image 120 may be additionally or alternatively processed through subsample module 112 and/or threshold module 114.

Subsample module 112 may perform a subsample operation on image 120 to reduce the resolution of the original breast image 120. A typical mammography image may have a resolution of 3000 by 4000 pixels such that defining a breast window around an image of this resolution may require unnecessary processing and cause undue delay in defining a breast window. In contrast, defining a breast window on a subsampled image of a lower resolution, e.g., 512×512 pixels in the subject embodiment, may reduce the time required to define a breast window, and thus may result in a more responsive mammography system 100. This may be because a subsampled image of a lower resolution would be more memory efficient by requiring less memory, and also less time-consuming for searching horizontally and vertically on the image. Also, subsampling the image 120 may help to reduce the amount of "salt and pepper" noise that may cause problems for the subsequent steps of thresholding and/or searching.

It will be understood that subsampled images of other resolutions are also within the contemplation of the subject embodiment, and may be employed to suit the accuracy and/or speed requirements of a user. For example, a resolution of 256×256 pixels may result in a quicker search for a breast window because fewer pixels will need to be analyzed, but the reduction in pixels may also cause blurring of the breast boundary so as to reduce accuracy. Conversely, a resolution of 1024×1024 pixels may improve accuracy, but may result in slower performance.

The subsampled image may further be processed through threshold module 114. As will be described in greater detail below, threshold module 114 calculates a threshold from at least a statistical parameter of the image and thresholds the image to identify all pixels of the image as either breast pixels or non-breast pixels. In doing so, a binary image is generated such that any greyscale inherent in the image 120 is removed. The creation of a binary version of the image 120 allows the breast window module 110 to operate more efficiently by allowing it to easily identify the breast boundary on the breast image when it reaches a substantial number of non-breast pixels.

Image database 122 stores breast images 120, and may be implemented using any database software or persistent storage method known in the art. For example, image database 122 may be implemented using Oracle®, Microsoft SQL Server® or IBM DB2® with suitably defined schemas to identify and navigate images 120. In the exemplary embodiment, image database 122 may be part of a Picture Archiving and Communication Systems (PACS) deployment, such as those found in a hospital. While image database 122 is illustrated as residing in the same memory as mammography system 100, it will be understood that image database 122 may be stored and accessed remotely through a network connection, for example, using a Digital Imaging and Communications in Medicine (DICOM) protocol. In such case, it will be further understood that the operations of the breast window module 110 may be performed locally on the mammography system, remotely on the system where the image database 122 resides, or on a third-party system configured to access image database 122 and mammography system 100.

Referring to FIG. 2A, therein illustrated is a schematic diagram illustrating the definition of a breast window 210 within an image 120 and the application of the breast window 210 to a breast image 202 for close examination. Image view 120a stored on image database 122 shows an image 120 in its original state containing a breast image 202. On image view 120b, a breast window 210 around breast image 202 is defined after being processed through breast window module 110 (and/or subsample module 112 and threshold module 114). In image view 120c, the breast window 210 is then used to enlarge the view of the breast image 202 on mammography system 100 such that the whole of the breast image 202 is more easily viewable.

Figure 2B:
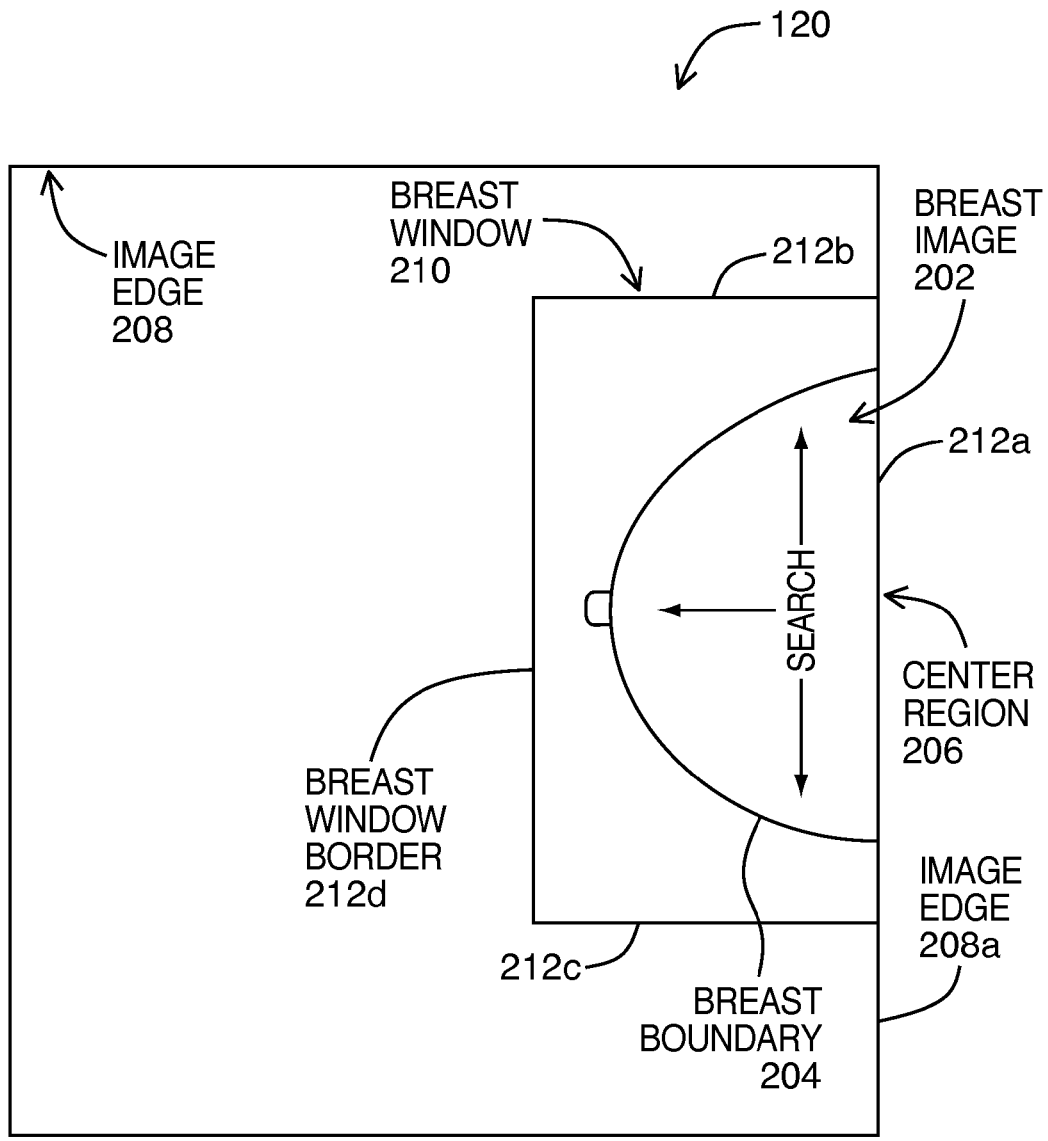
FIG. 2B is a schematic diagram illustrating an example image containing a breast with a defined breast window.

Referring to FIG. 2B, therein illustrated in greater detail is an exemplary image 120 of a CC view of a breast. Image 120 has four edges, shown generally as 208, and may contain a breast image 202 with a breast boundary 204. The subject embodiment analyzes image 120 to define breast window 210 around breast image 202.

Figure 3:
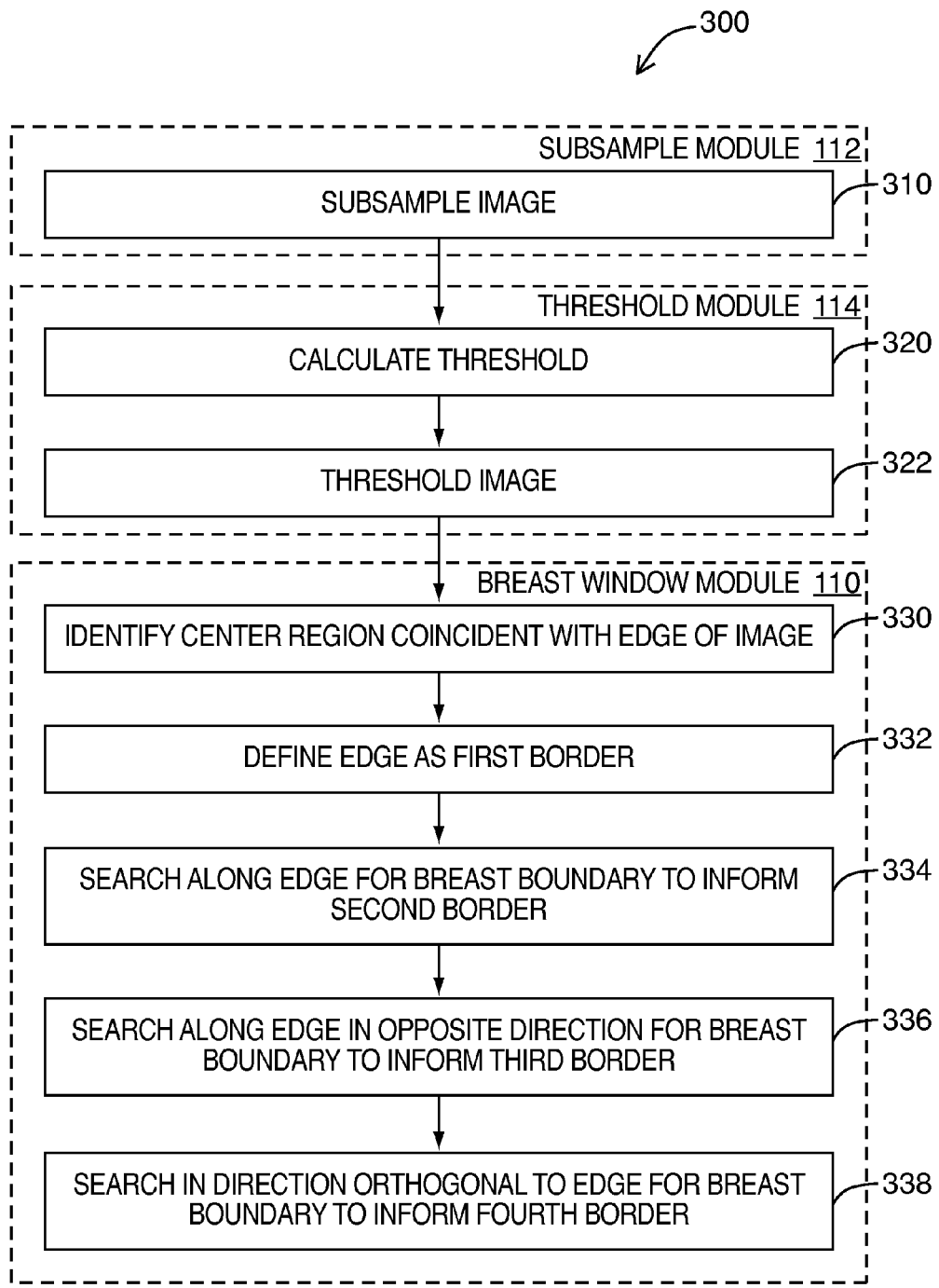
FIG. 3 is a flowchart diagram illustrating the steps of a method for defining a breast window.

Referring simultaneously to FIG. 3, therein illustrated are steps of a method for defining a breast window 210 on image 120 of a breast, shown generally as 300. Initially, image 120 is optionally processed through subsample module 112 to reduce the resolution of the image 120 (310). The subsample image may only be used for the purposes of defining a breast window and will not affect the original image 120. After having defined the breast window 210 on the subsample image, the breast window 210 is scaled to the original image 120 to form the breast window 210 on the original image 120. This may help ensure that finer details of original image 120 are maintained when a radiologist examines image 120.

The image 120 (or the subsampled version of it) may then be processed through the threshold module 114, during which the image 120 may be turned into a binary image. The process of turning the image into a binary image facilitates quicker searching during the process of defining a breast window 210 as searching for the breast boundary on a binary image does not requires the use of traditional edge detection techniques which are computationally intensive. As is described in greater detail below, an initial threshold must first be calculated (320), before the threshold can be used to identify the various pixels of image 120 as breast pixels or non-breast pixels (322).

Image 120 may then be processed through breast window module 110 to identify breast window 210. Breast window module 210 first identifies a center region of the breast 206 coincident with an edge 208 of the image 120 by examining and comparing pixels near the center point of each image edge 208. The edge 208 having the brightest pixels is identified as the edge 208a coincident with the center region of the breast 206 (330). Additionally or alternatively, if edge 208a coincident with the center region of the breast 206 is typically known in advance before processing due to the nature of the input (for example, images 120 may always be inputted into mammography system 120 with center region of the breast 206 coincident with the left edge), image 120 may be rotated or flipped such that the edge 208a is always oriented on one side before searching begins (e.g., always oriented to the right edge).

The edge of the image 208a coincident with the center region of the breast 206 may be defined as a first border 212a of breast window 210 (332).

At step 334, searching is conducted from the center region of the breast 206 along the edge of the image 208a for the breast boundary 204. If the breast boundary 204 is found, the breast boundary 204 informs the second breast border 212b of breast window 210 by defining the second border 212b as a line orthogonal to the direction of the searching at a position where the breast boundary is found. If the breast boundary 204 is not found before reaching an edge of the image (as may be the case where for a MLO image), the edge of the image 208 may form the second border 212b of breast window 210.

Step 336 involves searching along the edge of the image 208a for breast boundary 204 in a direction opposite from the direction of the searching in step (334). As in step 334, if the breast boundary 204 is found, the breast boundary 204 informs the third breast border 212c of breast window 210 by defining the third border 212c as a line orthogonal to the direction of the searching at a position where the breast boundary is found. If the breast boundary 204 is not found before reaching an edge of the image, the edge of the image 208 may form the third border 212c of breast window 210.

Searching for the breast boundary 204 is then repeatedly conducted from the center region of the breast 206 in a direction orthogonal to the edge of the image 208a (338) for a point on the breast boundary 204 most distant from the edge of the image 208a. If found, the breast boundary 204 informs the fourth border 212d of breast window 210 by defining the fourth border 212d as a line orthogonal to the direction of the searching. If the breast boundary 204 cannot be found before reaching an edge of the image (as may be the case if the breast image 202 substantially fills the image 120 such that there are very few or no background pixels between the breast boundary 204 and the edge of the image 208 opposite the breast image 202), the edge of the image 208 may form the fourth border 212d of breast window 210.

It will be understood that although the identification of breast window borders 212a, 212b, 212c and 212d have been discussed in an order, variations on the order of their identification is within the contemplation of the subject embodiment and no specific order is required whether or not such steps are described in claims or otherwise in numbered or lettered paragraphs.

Figure 4:
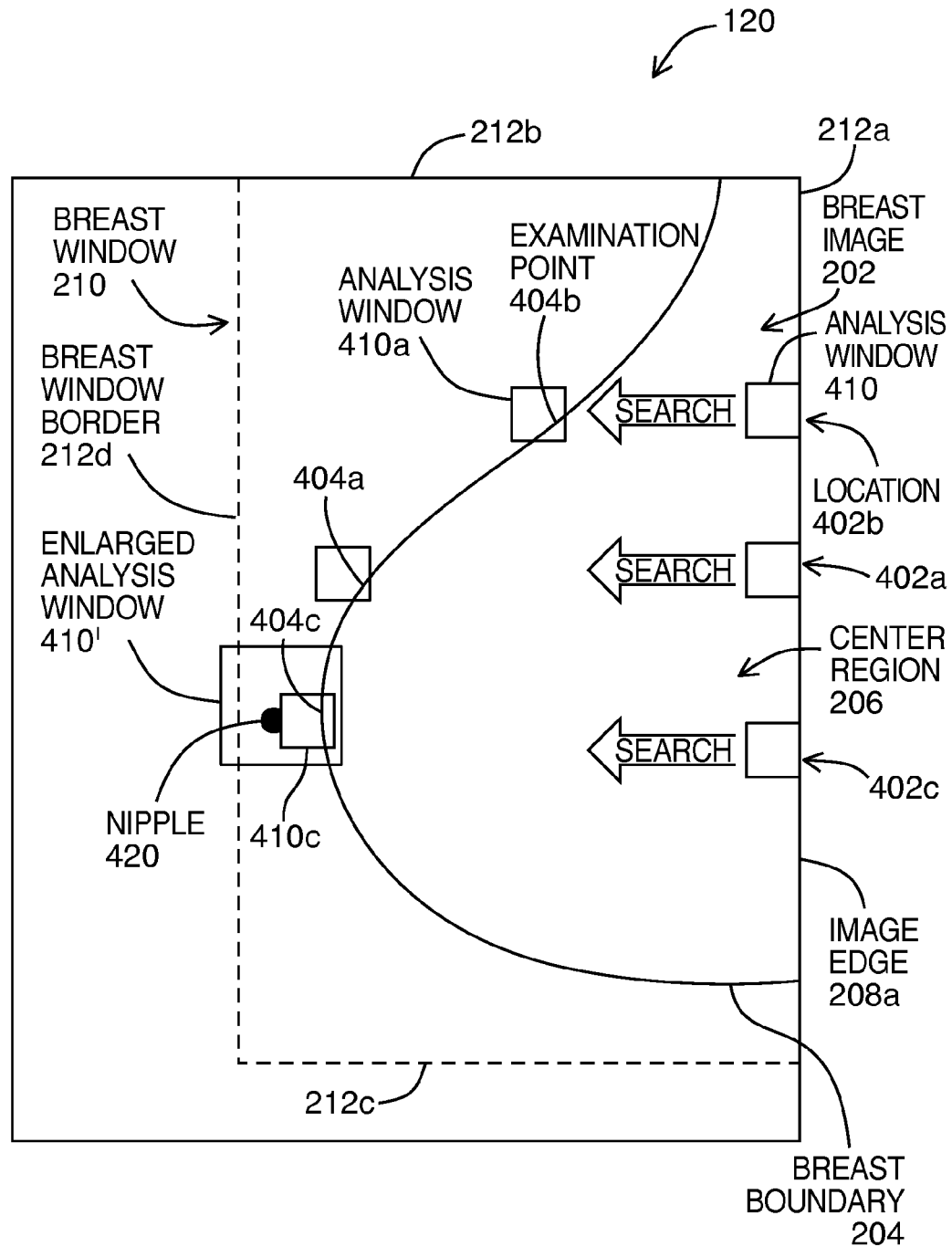
FIG. 4 is a schematic diagram of an example image containing a breast illustrating the search for a breast window border opposite from the breast image.
Figure 5:
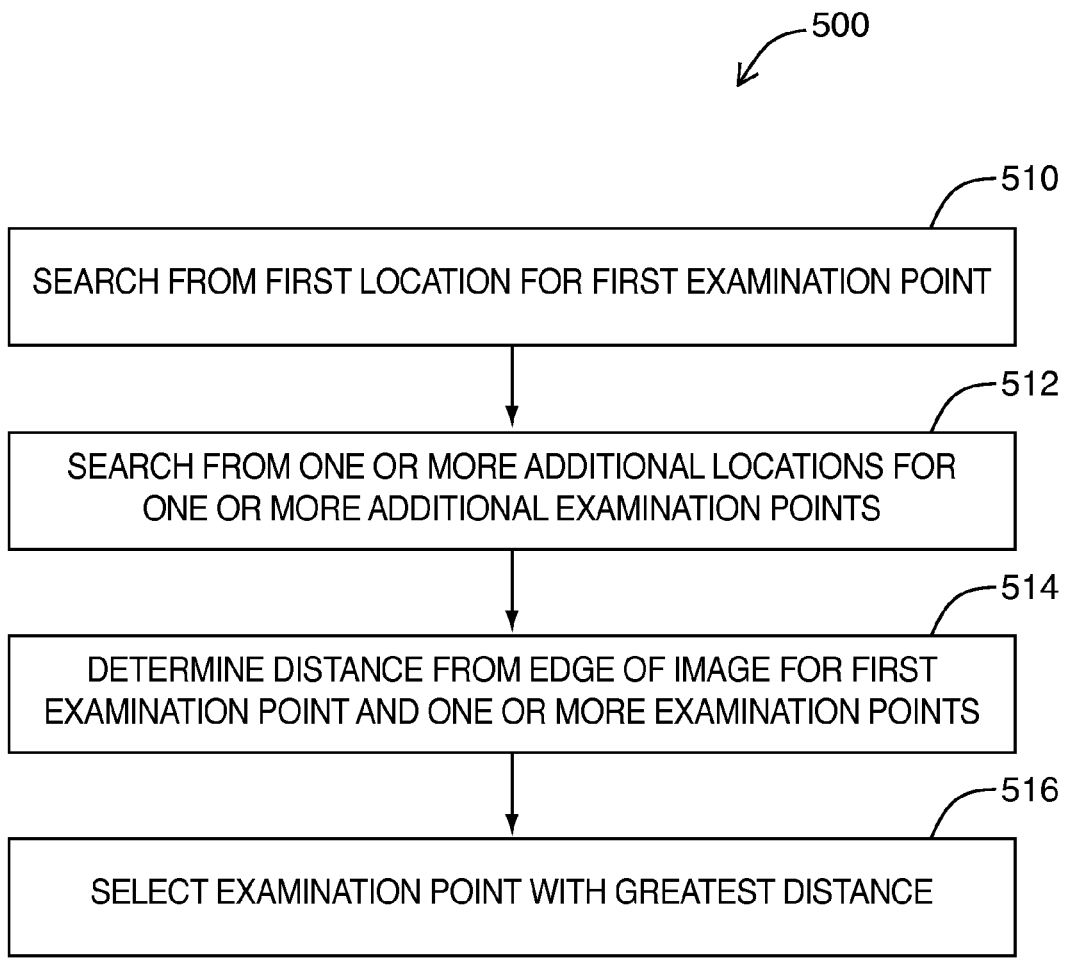
FIG. 5 is a flowchart diagram illustrating the steps of a method for searching for a breast window border opposite from the breast image.

Referring to FIG. 5, therein illustrated in greater detail is step 338 of FIG. 3 for searching for the fourth border 212d of breast window 210, shown generally as 500. Referring simultaneously to FIG. 4, therein illustrated is an exemplary MLO image for the purposes of searching for the fourth border 212d of breast window 210. A first location 402a is identified within the center region of the breast 206, and a search is conducted from the first location 402a in a direction orthogonal to the edge of the image 208a for a first examination point 404a on the breast boundary 204 (510). Typically the first location 402a is selected to be near a location that bisects the edge of the image 208a coincident with the center region of the breast 206.

One or more additional locations on the center region of the breast 206 may then be selected. These additional locations may be a fixed distance away from the first location 402a, or they may be removed from first location 402a by a fraction of the length of the image edge 208a. In the exemplary embodiment, a distance approximately equal to roughly ⅕ of the length of the image edge 208a separates second and third locations 402b, 402c from the first location 402a. It will be understood that additional or alternate fractions may be used to determine locations on the center region of the breast, and that other mechanisms of selecting locations within the center region of the breast 206 may also be used. It will also be understood that while the exemplary embodiment illustrates the use of 3 locations on the center region 206, fewer or more locations may be used for the purposes of searching for the fourth breast window border 212d.

Having identified additional locations 402b and 402c, the searching process conducted for the first location 402a is repeated to find additional examination points 404b and 404c respectively (512). The distance from each examination point to the image edge 208a may then be compared (514) and the examination point with the greatest distance 404c may be selected as the point on the breast boundary 204 as the point most distant from the image edge 208a (516). This furthest point 404c may typically then inform the fourth border 212d of breast window 210.

When searching, an analysis window 410 may be used to select and analyze pixels of images 120. In the exemplary embodiment where image 120 is first subsampled to a lower resolution of 512×512 pixels, the analysis window 410 may be 7×7 pixels. Alternate window sizes may be used for images 120 of the same or alternate resolutions of subsampled or original images 120.

When searching, the analysis window may be iteratively moved from the starting location of the center region of the breast 206 in a desired direction (e.g., along the edge of the breast 208a or orthogonal to the edge of the breast 208a). Such searching may involve analyzing the contents of each successive neighboring analysis window 410 to determine if the pixels in each analysis window 410 substantially consist of non-breast pixels. In the exemplary embodiment, images 120 may be thresholded such that the image being searched is a binary image consisting only of breast pixels and non-breast pixels. In such embodiment, searching may be a simple arithmetic operation that involves calculating the percentage of non-breast pixels in the analysis window and comparing that number with a pre-defined percentage to determine if the number of non-breast pixels meets or exceeds the pre-defined percentage. In the exemplary embodiment, the pre-defined percentage may be 95%, although other suitably high pre-defined percentages may be appropriate.

It will be understood that although the exemplary embodiment performs searching on a thresholded binary image, searching may also be performed on a non-binary image. In such an embodiment, searching for a breast boundary 204 may involve traditional edge detection techniques that may be more computationally intensive.

As illustrated by analysis window 410a, a requirement of a substantially high pre-defined non-breast pixel percentage may cause the analysis window 410a to move slightly past the breast boundary 204 before searching is completed. Such configuration may help ensure that the definition of a breast window border 212 encompasses the entirety of the breast image 202 by leaving a margin of non-breast pixels between the breast image 202 and the breast window border 212. Also, such high pre-defined percentage may help to ensure that any noise or markup on the breast image 202 appearing as a non-breast pixel does not erroneously cause the searching to stop prematurely. This is because markup or noise is unlikely to fill the entirety of an analysis window 410.

A scenario may arise that requires analysis window 410 to be dynamically alterable in size when searching. As discussed above, in the exemplary embodiment of searching a subsampled binary image of 512×512 pixels, analysis window 410 may have a window size of 7×7 pixels. When searching for the fourth breast window border 212d opposite from the image edge 208a, it may be possible that the thresholding process (described in greater detail below) identifies some pixels in between the nipple 420 and the breast image 202 as non-breast pixels. This may result in the nipple 420 appearing detached from the breast image 202 such that when searching with a small analysis window size 410c, there may be a false indication of the breast boundary 204. Such false indication may result an inaccurate breast window 210 that excludes the nipple 420. Dynamically altering the analysis window to use a larger window size 410' when searching for the fourth breast window border 212d may prevent such an occurrence by requiring a larger number of non-breast pixels to be in the analysis window 410' before the breast boundary 204 is indicated. In the exemplary embodiment of searching a subsampled 512×512 pixel binary image, a dynamically altered analysis window 40×40 pixels may be suitable. Such larger window size 410' may be used throughout the search for breast window border 212 from the center region 206, or the window size may be enlarged only after a preliminary identification of breast boundary 204 to determine if the breast boundary identified with the smaller window size 410 was accurate.

Figure 6:
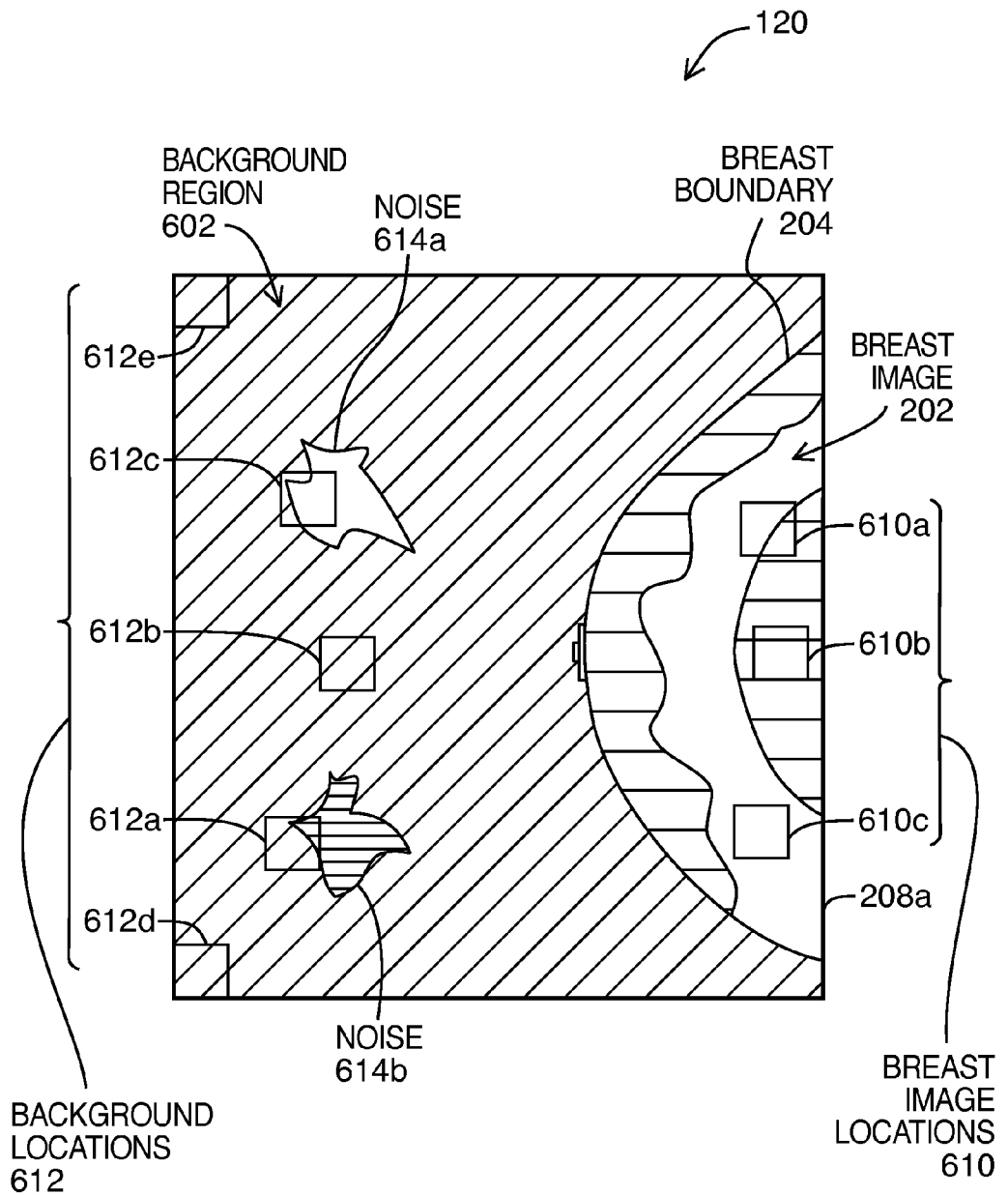
FIG. 6 is a schematic diagram of an example mammography image showing the selection of locations on the background region and locations on the breast image for the purposes of selecting a threshold.

Referring now to FIG. 6, therein illustrated is an exemplary mammography image for processing to become a binary image. As noted earlier, breast window 210 may be defined on images 120 that may be mammography images that have a background region 602 (shown as filled with diagonal lines) and a breast region 202 (shown as filled with white space and horizontal lines). Typical mammography images may comprise pixels on a 12-bit greyscale distribution that exhibit varying degrees of brightness (also called lightness, grayscale value or tone). A histogram of such an image (plotting the number of pixels for each available tonal value of the greyscale distribution) may typically have a broad tonal range with a large concentration of darker pixels from the background region 602, and a large concentration of brighter pixels from the breast image 202. As such, statistical parameters from a breast image location 610 and a background location 612 may be chosen to determine the threshold.

As noted, the below-described approach of generating a binary image when searching for a breast window 210 avoids traditional edge detection techniques which typically involve the determination of first or second order derivatives for identifying the rate and direction of change in brightness amongst a sequence of neighboring pixels. The determination of derivatives may typically be computationally expensive and would reduce the perceived performance of mammography system 100 when identifying a breast window 210. Instead, the described method determines a threshold value by employing arithmetic operations on statistical values of various discrete locations on the image 120. As arithmetical operations can be performed quickly by a computer, the involvement of calculating a threshold and thresholding the image may help to improve the speed of defining a breast window 210.

To achieve a minimum threshold tolerance, an adaptive method is employed to find suitable locations on image 120 that meets the threshold tolerance. For example, the location 610 on the breast image 202 may be selected from one of a plurality of breast image locations (e.g., 610a, 610b or 610c) that contain varying degrees of brightness due to the density of the tissue of the breast being imaged (the darker areas shown as filled with horizontal lines). Likewise, location 612 on the background region 602 may be selected from one of a plurality of background locations near an edge of the background region 602 that may also contain varying degrees of darkness. Brightness in the background region 602 may be due to markups (not shown) made on an image 120 by a radiologist (typically on the top or bottom of an image 120). To avoid markups, background locations 612 are typically selected from the center of the background region 602 (e.g., 612a, 612b or 612c). Brightness in the background region 602 may also be due to noise 614a, 614b such that selection of background regions (e.g., 612c, 612a) from the center of the background region 602 may not ensure that noise 614a, 614b is avoided.

If the minimum threshold tolerance cannot be achieved with the first selected background locations 612, a corner of the image 612d, 612e coincident with the edge of the image opposite the breast image 202 may be selected. Such selection may serve as last attempts in identifying dark pixels for determining a minimum threshold. This may be needed in the case that the selected background locations 612 are particularly noisy or if a breast image 202 completely fills the image 120. Due to curved nature of a breast image 202, a corner of the image opposite from the breast image 202 is most likely to contain dark background pixels. If a minimum threshold tolerance cannot be determined through the selection of background locations 612 and breast image locations 610, a binary image may not be derived from a given mammography image 120. In such case, searching may occur on the original image 120 or the edges 208 of the image 120 may be returned as the breast window 210.

Figure 7:
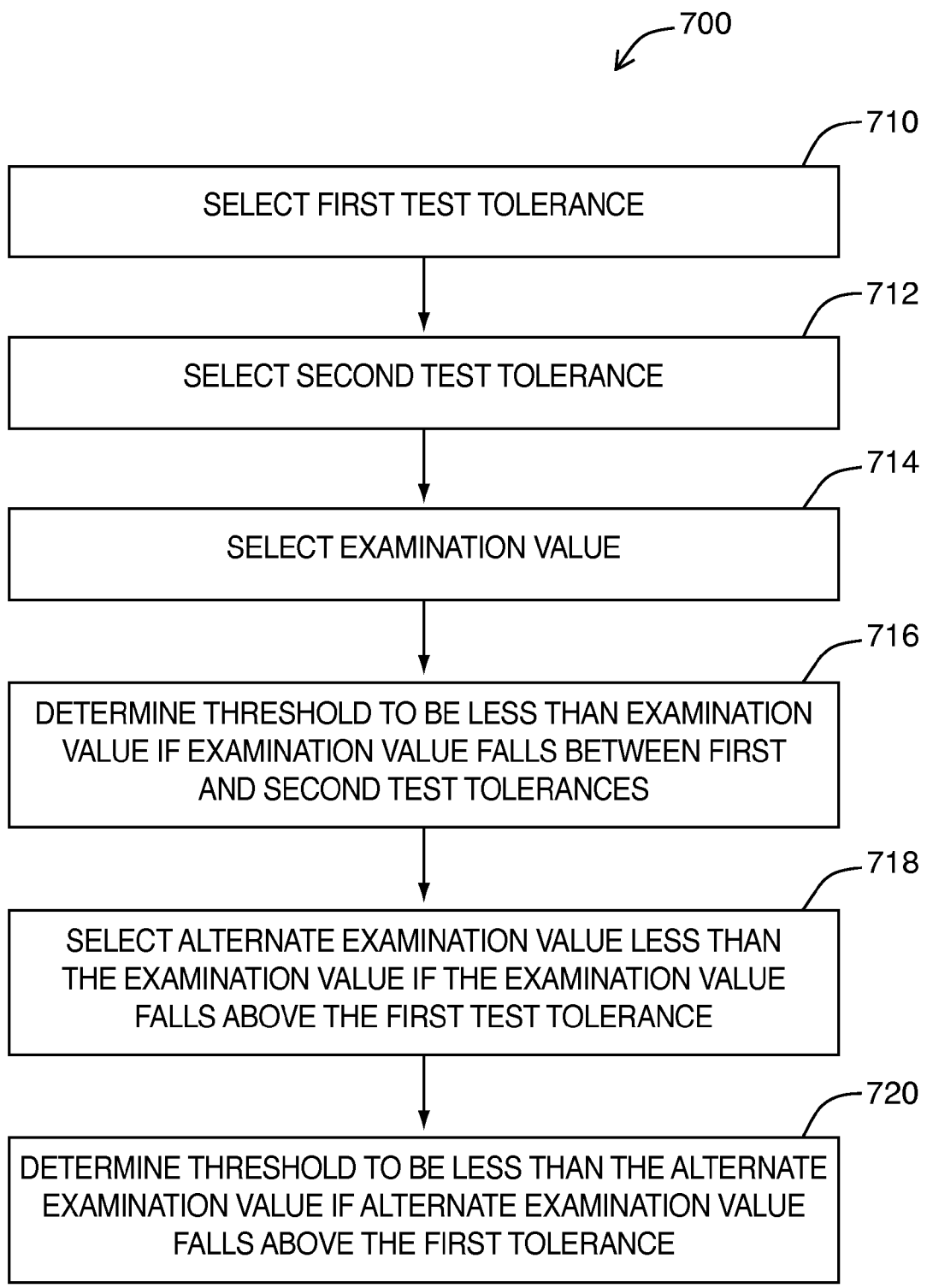
FIG. 7 is a flowchart diagram illustrating the steps of a method for determining a threshold that achieves a minimum threshold tolerance.
Figure 8A:
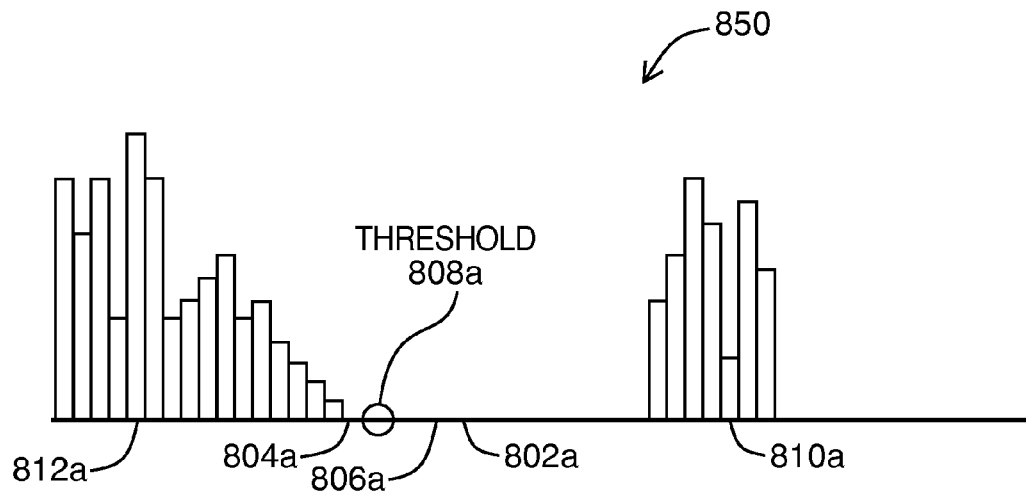
FIGS. 8A-8C are example image histograms for images that need to be thresholded.

Referring now also to FIG. 7, therein illustrated are steps of a method for calculating the threshold used to generate the binary image in greater detail (step 320 in FIG. 3), shown generally as 700. Referring simultaneously also to FIG. 8A, therein illustrated is a simplified example image histogram, shown generally as 850, to illustrate the determination of a threshold tolerance. After having selected an initial breast image location 610a and an initial background location 612a, the mean and standard deviation of the brightness values within each location may be determined. A first test tolerance 802a based on the standard deviation of the background location 612a may then be may be selected (710). In the exemplary embodiment (where the image may be a 12-bit mammography image with a data range of 0 to 4095), the first test tolerance 802a may be 3 times the standard deviation of the background location 612a. A second test tolerance 804a less than the first test tolerance 802a, based also on the standard deviation of location 612a, may then be selected (712). In the present embodiment, the second test tolerance may be defined to be ⅔ the first test tolerance 802a. The two test tolerances define a range of tonal values brighter than the mean value 812a of the background location 612a for which an examination value 806a may fall between to achieve a desired minimum threshold.

It will be understood by those skilled in the art that while the term standard deviation is used, it may also refer to the term variance without altering the operation of the described steps.

It may be the case that the standard deviation of the selected background location 612 has a standard deviation of zero. In such case, the first test tolerance 802a may be defined to be a suitably high brightness value. In the exemplary embodiment, this value may be 20.

An examination value 806a may then be determined based on a difference between the mean brightness value 810a of the breast location 610a and the mean brightness value 812a of background location 612a (714). In the exemplary embodiment, the examination value may be one-half the difference between the two mean values. If the examination value 806a falls between the first and second test tolerances (i.e., within the range defined by the two test tolerances 804a, 802a), the threshold 808a may be selected as a value less than the examination value 806a (716). For example, the tolerance may be selected as a fraction (e.g., 4/10) of the difference between the two mean values such that the threshold (defined as the background location mean 812a plus the tolerance) arrives at a value less than the examination value 806a (e.g., 5/10, or one-half the difference between the two mean values).

In the exemplary embodiment, such configuration may help to ensure that a minimum threshold is met by ensuring the difference between the examination value 806a (i.e., half the difference between the mean brightness values 812a, 810a) is at least two standard deviations away from the average brightness value 812a of the background location 612a.

Figure 8B:
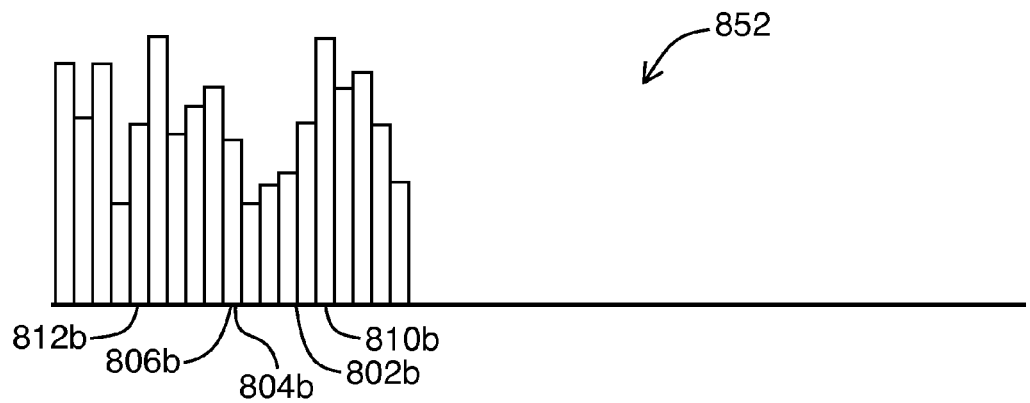

Referring now to FIG. 8B, therein illustrated is a simplified example image histogram, shown generally as 852, showing the scenario when an examination value 806b falls below the range defined by the first test tolerance 802b and the second test tolerance 804b. Referring again to FIG. 6, such a scenario may arise if background location 612b and breast image location 610b are selected. Particularly, location 610b may fall on an area of the breast image 202 that is particularly dark (as may be the case for a particularly fatty area of the breast). Because both background location mean 812b and breast image location mean 810b are close together (i.e., both are similarly dark), the difference between the mean values may be small such that the examination value 806b falls below the second test tolerance 804b (e.g., a multiple of the standard deviation of the background location 612b).

This scenario may also arise if both background location 612 and breast image location 610 are similarly bright as may be the case if background location 612 coincides with some noise or markup on image 120. For example, if background location 612c and breast image location 610c are selected, both locations may be bright because background location 612c coincides with noise 614a on the image 120. As such, the difference between the mean values will likely be small, making it difficult for examination value 806b to fall above the second test tolerance 804b.

If the examination value falls below the second test tolerance 804b, the minimum threshold tolerance has not been met and the steps described above may be repeated with alternate locations as per the adaptive method described above.

Figure 8C:
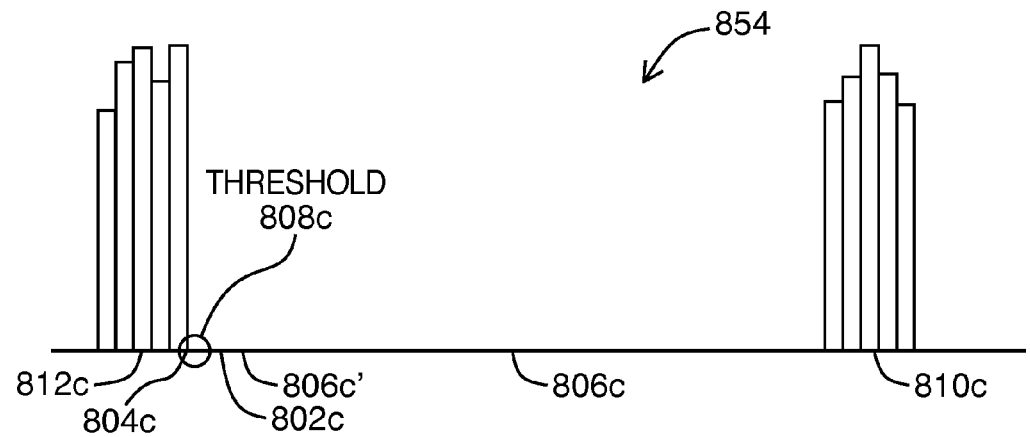

Referring now to FIG. 8C, therein illustrated is a simplified example image histogram, shown generally as 854, showing the scenario when an examination value 806c falls above the range defined by the first test tolerance 802c and the second test tolerance 804c. Referring again to FIGS. 6 and 7, such a scenario may arise if the selected background location 612 is particularly dark and the selected breast image location 610 is particularly bright (e.g., if locations 612b and 610c are selected respectively).

In such a scenario, due to the substantially uniform darkness of background location 612b, the standard deviation may be small such that first test tolerance 802c (e.g., 3× the standard deviation) may not be that far removed from the background location mean value 812c. At the same time, the difference between mean values 812c, 810c may be large such that the selection of the first examination point 806c (e.g., one-half the difference in the exemplary embodiment) may be well above the first test tolerance 802c. Thus, an alternate examination value 806c' less than the first examination value 806c is selected to determine if the threshold can be selected closer to the background mean value 812c (718). In the exemplary embodiment, the alternate examination value 806c' (e.g., 2/10 the difference between the mean values 812c, 810c in the exemplary embodiment) is also less than the threshold, 808a in FIG. 8A, that would have been assigned if the first examination value fell within the first and second test tolerance range (e.g., 4/10 of the difference between the mean values). If the alternate examination value 806c' is still above the first test tolerance 802c, a value below even the alternate examination value 806c' (e.g., the sum of background location mean 812*c* and ⅒ of the difference between the mean values 812*c*, 810*c*) is selected as the threshold 808*c* (720).

Such configuration may help to ensure that the minimum threshold tolerance is not set too high so as to improperly identify breast pixels as non-breast pixels. Since the objective of establishing the threshold is to create a binary image for the later searching of a breast boundary 204 for breast window 210, the configuration may be calibrated to ensure that the window captures the entirety of the breast, and not necessarily to accurately identify the boundary 204 of the breast. As such, the use of an alternate examination value 806*c*' when the first examination value 806*c* is greater than the first test tolerance 802*c* may help to ensure that the breast window 210 ultimately identified is correct.

While specific numeric values were provided above, it will be understood that other suitable numeric values are within the contemplation of the subject embodiment. Alteration of such values may be appropriate to optimize performance for different types of images 120.

It will also be understood that while the steps of the above method were performed in connection with the standard deviation (or variance) of the background location 612, the steps may be modified to take into account the standard deviation (or variance) of the breast location 610 to achieve similar results. In such case, instead of ensuring that that the threshold selected is suitably close to the background location 612 mean, the steps may be configured to ensure that the selected threshold is sufficiently distant from the breast image location 610 mean.

Further, while simplified image histograms were provided in FIGS. 8A-C, it will be understood that such figures were provided only to show general principles concerning the calculation of a minimum threshold tolerance, and that the various indications of test tolerance values, examination values and fractional multipliers may not accurately reflect the data illustrated. Moreover, it will be understood that such illustrative diagrams are not to be construed as limiting the characteristics of images (e.g., bit-range, tonal-range) that the subject embodiment may be operable on.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A method for a mammography system to define a breast window within an image for a breast, the mammography system comprising a memory for storing the image and a processor, said image containing a breast image having a breast boundary, the method comprising:
  (a) the processor identifying a predetermined edge of the image as being coincident with a center region of the breast image;
  (b) the processor defining the predetermined edge of the image as a first border of the breast window;
  (c) the processor searching from the center region along the predetermined edge for the breast boundary, wherein when located, the breast boundary informs a second border of the breast window;
  (d) the processor searching from the center region along the predetermined edge in a direction opposite from (c) for the breast boundary, wherein when located, the breast boundary informs a third border of the breast window;
  (e) the processor searching from a first location of the center region of the breast image, in a direction orthogonal to the predetermined edge, for a first examination point on the breast boundary;
  (f) the processor searching from one or more additional locations of the center region of the breast image, in a direction orthogonal to the predetermined edge, for one or more respective additional examination points on the breast boundary;
  (g) wherein the searching for the breast boundary in (c), (d), (e), and (f) comprises;
    (I) the processor creating an analysis window for analyzing pixels of the image and
    (II) the processor iteratively moving the analysis window in the direction of the searching until pixels in the analysis window substantially consist of non-breast pixels; and
  (h) the processor determining which of the first examination point or the one or more additional examination points is most distant from the predetermined edge, wherein the examination point most distant from the predetermined edge informs a fourth border of the breast window.

2. The method of claim 1, wherein when the breast boundary informs the second and third borders of the breast window, the processor defines each of the second and third borders of the breast window as a line orthogonal to the predetermined edge, at a position where the breast boundary is found.

3. The method of claim 1, wherein the analysis window is dynamically alterable in size.

4. The method of claim 1, wherein the image comprises a binary image derived from a mammography image, the binary image being derived by:
  (i) calculating a threshold from at least one statistical parameter of a location on the breast image of the mammography image and at least one statistical parameter of a location on the background region of the mammography image; and
  (ii) thresholding the mammography image using the threshold, wherein pixels are identified as one selected from the group of: breast pixels and non-breast pixels.

5. The method of claim 4, wherein said calculating comprises:
  (A) selecting a first test tolerance based on a standard deviation of the location on the background region;
  (B) selecting a second test tolerance less than the first test tolerance based on the standard deviation;
  (C) selecting an examination value based on a difference between mean values of the location on the breast image and the location on the background region; and
  (D) determining the threshold to be less than the examination value when the examination value falls between the first and second test tolerances.

6. The method of claim 5, further comprising:
  (E) selecting an alternate examination value less than the examination value when the examination value falls above the first test tolerance; and
  (F) determining the threshold to be less than the alternate examination value when the alternate examination value falls above the first tolerance.

7. The method of claim 4, wherein the threshold exceeds a minimum threshold tolerance, and the location on the breast image is selected from one of a plurality of breast image locations to achieve the minimum threshold tolerance.

8. The method of claim 4, wherein the threshold exceeds a minimum threshold tolerance, and the location on the background region is selected from one of a plurality of background locations to achieve the minimum threshold tolerance.

9. The method of claim 8 wherein the selected location on the background region is a corner of the image, wherein the corner coincides with an edge of the image opposite the predetermined edge.

10. The method of claim 1, wherein the image comprises a subsample image of a mammography image.

11. A non-transitory computer-readable storage medium comprising a plurality of instructions for execution on a processor, the instructions for performing the steps of the method of claim 1.

12. A system for defining a breast window within an image for a breast, said image containing a breast image having a breast boundary, the method comprising:
 (a) a memory for storing the image;
 (b) a processor coupled to the memory for:
  i. identifying a predetermined edge of the image as being coincident with a center region of the breast image;
  ii. defining the predetermined edge of the image as a first border of the breast window;
  iii. searching from the center region along the predetermined edge for a breast boundary, wherein when located, the breast boundary informs a second border of the breast window;
  iv. searching from the center region along the predetermined edge in a direction opposite from (iii) for the breast boundary, wherein when located, the breast boundary informs a third border of the breast window;
  v. searching from a first location of the center region of the breast image, in a direction orthogonal to the predetermined edge, for a first examination point on the breast boundary;
  vi. searching from one or more additional locations of the center region of the breast image, in a direction orthogonal to the predetermined edge, for one or more respective additional examination points on the breast boundary;
  vii. wherein the searching for the breast boundary in (c), (d) (e), and (f) comprises:
   (I) the processor creating an analysis window for analyzing pixels of the image; and
   (II) the processor iteratively moving the analysis window in the direction of the searching until pixels in the analysis window substantially consist of non-breast pixels; and
  viii. determining which of the first examination point or the one or more additional examination points is most distant from the predetermined edge, wherein the examination point most distant from the predetermined edge informs a fourth border of the breast window.

13. The system of claim 12, wherein when the breast boundary informs the second and third borders of the breast window, the processor defines each of the second and third borders of the breast window as a line orthogonal to the predetermined edge, at a position where the breast boundary is found.

14. The method of claim 12, wherein the analysis window is dynamically alterable in size.

15. The system of claim 12, wherein the image comprises a binary image derived from a mammography image, and when creating a binary image, involves the processor:
 (A) calculating a threshold from at least one statistical parameter of a location on the breast image of the mammography image and at least one statistical parameter of a location on a background region of the mammography image; and
 (B) thresholding the mammography image using the threshold, wherein pixels are identified as one selected from the group of: breast pixels and non-breast pixels.

16. The system of claim 15, wherein said calculating involves the processor:
 (a) selecting a first test tolerance based on a standard deviation of the location on the background region;
 (b) selecting a second test tolerance less than the first test tolerance based on the standard deviation;
 (c) selecting an examination value based on a difference between mean values of the location on the breast image and the location on the background region; and
 (d) determining the threshold to be less than the examination value when the examination value falls between the first and second test tolerances.

17. The system of claim 16, wherein the processor is further configured for:
 (e) selecting an alternate examination value less than the examination value when the examination value falls above the first test tolerance; and
 (f) determining the threshold to be less than the alternate examination value when the alternate examination value falls above the first tolerance.

18. The system of claim 15, wherein the threshold exceeds a minimum threshold tolerance, and the location on the breast image is selected from one of a plurality of breast image locations to achieve the minimum threshold tolerance.

19. The system of claim 15, wherein the threshold exceeds a minimum threshold tolerance, and the location on the background region is selected from one of a plurality of background locations to achieve the minimum threshold tolerance.

20. The system of claim 19 wherein the selected location on the background region is a corner of the image, wherein the corner coincides with an edge of the image opposite the predetermined edge.

21. The system of claim 12, wherein the image comprises a subsample image of a mammography image.

* * * * *

UNITED STATES PATENT AND TRADEMARK OFFICE
CERTIFICATE OF CORRECTION

| | |
|---|---|
| PATENT NO. | : 8,649,578 B2 |
| APPLICATION NO. | : 12/719373 |
| DATED | : February 11, 2014 |
| INVENTOR(S) | : Yi Yang |

It is certified that error appears in the above-identified patent and that said Letters Patent is hereby corrected as shown below:

In the Claims,

Column 13, line 16, Claim 12 should read "A system for defining a breast window within an image for a breast, said image containing a breast image having a breast boundary, the system comprising: ..."

Column 14, line 7, Claim 14 should read "The system of claim 12, wherein the analysis window is dynamically alterable in size."

Signed and Sealed this
Seventh Day of June, 2016

Michelle K. Lee
*Director of the United States Patent and Trademark Office*